United States Patent [19]

Graybill

[11] 3,995,170

[45] Nov. 30, 1976

[54] WIND ENERGY CONVERSION DEVICE

[76] Inventor: Clinton L. Graybill, P.O. Box 396, Superior, Mont. 59872

[22] Filed: Feb. 26, 1975

[21] Appl. No.: 553,255

[52] U.S. Cl. .................................. 290/55; 290/44; 60/398
[51] Int. Cl.² ...................... F03D 3/00; H02P 9/04
[58] Field of Search ................. 290/55, 54, 53, 42, 290/43, 44; 60/398

[56] References Cited
UNITED STATES PATENTS

| 704,507 | 7/1902 | Bruneau | 290/55 |
|---|---|---|---|
| 1,046,026 | 12/1912 | Salisbury | 290/55 |
| 1,766,765 | 6/1930 | Savonius | 290/55 |
| 2,431,111 | 11/1947 | Du Brie | 290/55 |
| 2,633,921 | 4/1953 | Monney | 290/55 |
| 3,743,848 | 7/1973 | Strickland | 290/55 |
| 3,793,530 | 2/1974 | Carter | 290/55 |

Primary Examiner—Robert S. Macon
Attorney, Agent, or Firm—Wells, St. John & Roberts

[57] ABSTRACT

A wind energy conversion device for converting directional wind force to torque along on a vertical rotational axis. The device includes a plurality of flexible vanes mounted to a framework for rotation therewith about a vertical axis. The vanes are mounted to upright posts on the framework. Axial vane side edges extend to opposite radial sides of the posts and are connected in a specific manner to the frame in order to produce a positive effect on rotation of the device in a prescribed direction, in response to wind currents.

10 Claims, 5 Drawing Figures

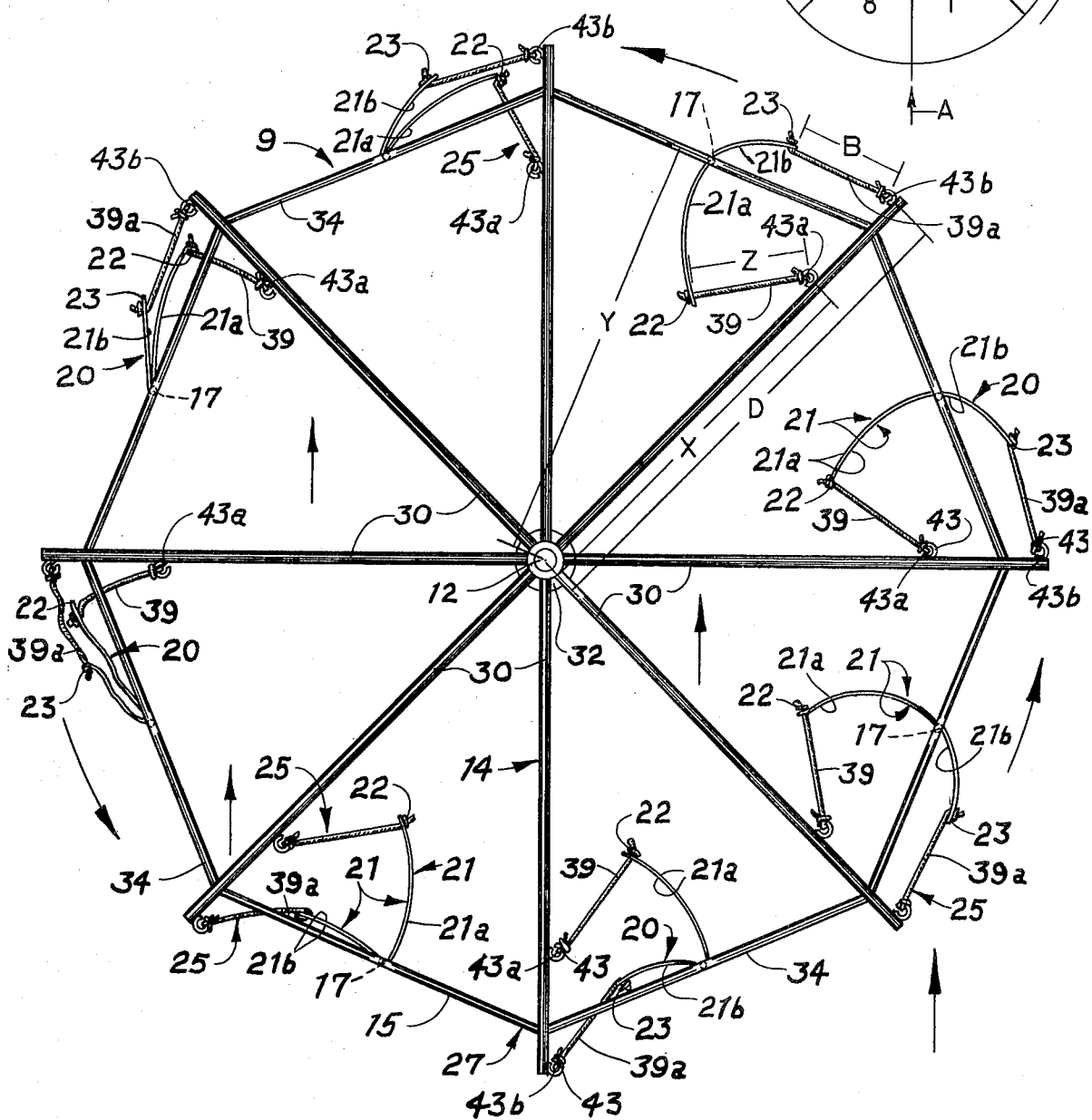
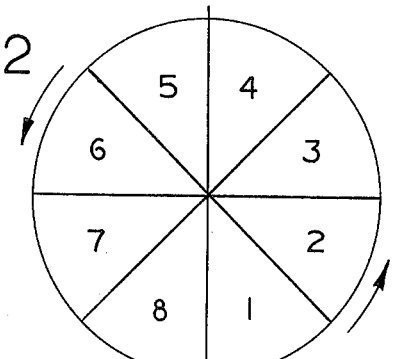
FIG 2
FIG 1

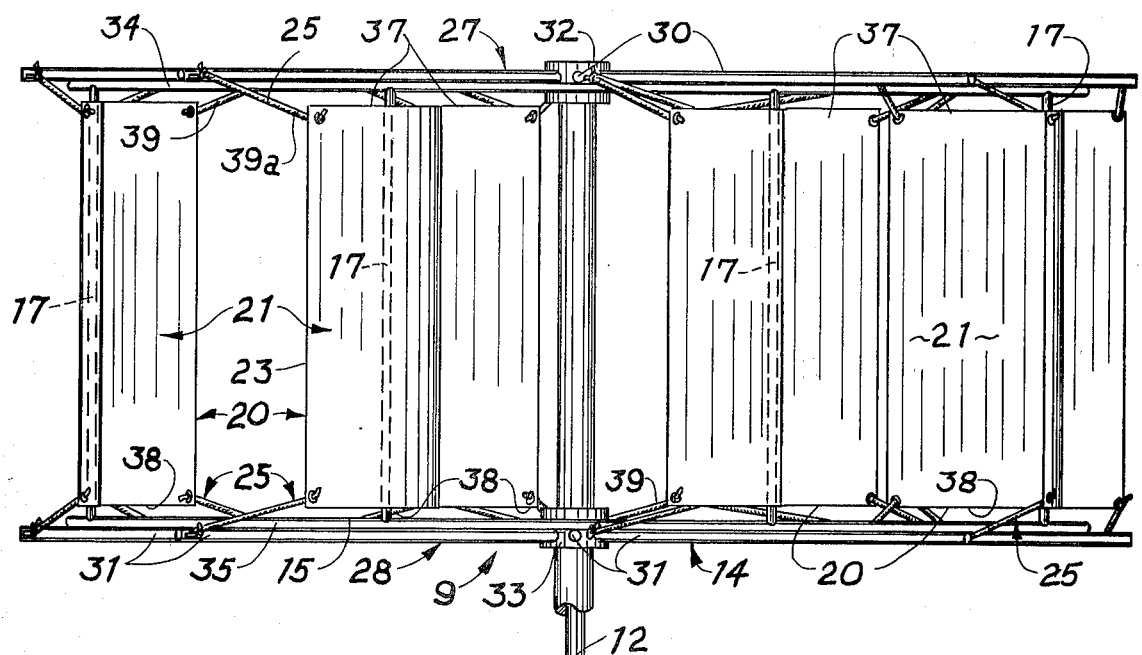
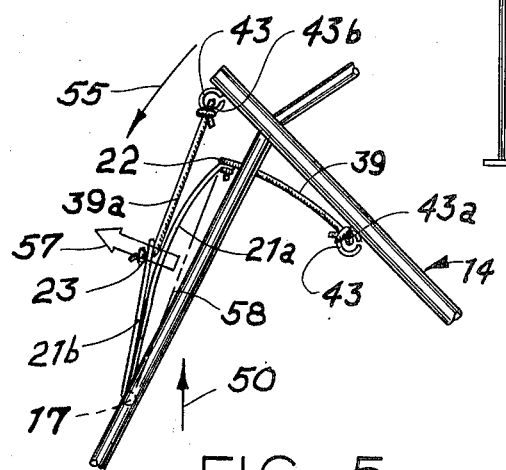
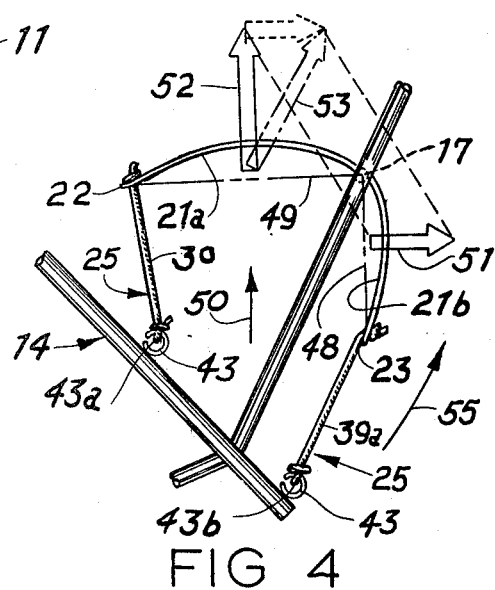

WIND ENERGY CONVERSION DEVICE

BACKGROUND OF THE INVENTION

The present invention relates basically to wind energy conversion devices and more particularly to such devices that operate on a vertical rotational axis.

It is presently becoming more important to provide means for creating electrical energy without reducing the world's supply of fossil fuel. Various successful attempts have been made to convert energy of natural phenomena to electricity as evidenced by hydroelectric dams, geothermic steam converters, and solar energy conversion devices. Although serviceable on a large scale, these apparatus cannot be solely relied upon to supply sufficient electrical energy for presently increasing needs.

Wind energy, although it has been long utilized for other purposes, is seldom used to generate electrical power, primarily because wind is unpredictable and very difficult to control. One particular problem is to design a wind energy conversion device that will withstand sudden high velocity bursts of wind and that will further operate efficiently in relatively low wind velocity. This problem has been considered in U.S. Pat. No. 704,507 to Bruneau. Bruneau discloses a windmill that operates on a horizontal axis and utilizes flexible fabric sails that are operatively attached to a counter weight mechanism. During gusts of wind, the sails automatically adjusts correspondingly to raise or lower the counterweights and thereby prevent damage to the windmill or sails attached thereto.

U.S. Pat. No. 1,766,765 to Savonius discloses a fixed vane rotor that includes vanes fixed to a centrifugal clutch arrangement in a hollow cylindrical housing to produce optimum efficiency in converting wind energy to drive an electrical generator. U.S. Pat. No. 1,046,026 shows a series of concentric tracks having sail driven carriages thereon for turning a center shaft. Each sail is loosely tethered to its respective carriage, allowing it to shift about its mast in response to wind force.

U.S. Pat. No. 3,793,530 to Carter discloses a wind turbine generator using a louvered drum that is rotatably mounted to a shaft for free rotation about a vertical axis. The plurality of louvers are connected by linkages that operate to expose a large surface area on one side of the rotor, and to turn the louvers on the opposite side of the rotor to present a relatively smaller surface area to the wind direction. A similar apparatus is disclosed in U.S. Pat. No. 3,743,848 to Strickland.

U.S. Pat. No. 2,633,921 to Monney also discloses a windmill that operates similar to the Bruneau windmill in that it is supplied with a force dampening spring to prevent damage of the windmill during high velocity winds.

Although the above cited apparatus appear serviceable, most are rather inefficient or utilize much of the wind energy for controlling the apparatus themselves, rather than for generating electric current.

It is a primary object of the present invention to provide a wind energy conversion apparatus that will operate more efficiently to convert wind force to shaft torque.

An additional object is to provide such an apparatus that will function both in high velocity winds and in situations where there is little wind current.

A yet further object of my invention is to provide such an apparatus that includes safety features to prevent damage from being done to the elements thereof during gusts or excessively high velocity wind.

These and other objects and advantages will become apparent upon reading the following disclosure which, taken with the accompanying drawings, describes a preferred form of the present invention.

BRIEF DESCRIPTION OF THE DRAWINGS

A preferred form of the present invention is illustrated in the accompanying drawings in which:

FIG. 1 is a plan view of my device in operation;

FIG. 2 is a legend utilized in describing operation of my invention;

FIG. 3 is a side elevational view of the device shown in FIG. 1;

FIG. 4 is an enlarged diagrammatic view of a portion of my device during operation; and FIG. 5 is another enlarged diagrammatic view illustrating a different portion during operation of my apparatus.

DETAILED DESCRIPTION OF A PREFERRED EMBODIMENT

Reference will now be made in greater detail to the drawings, with particular emphasis placed on FIGS. 1 and 3. A preferred form of the apparatus is illustrated in FIGS. 1 and 3 and is generally designated therein by the reference character 9.

Basically, the apparatus includes a central supporting framework 10 housing a generating unit 11. Framework 10 also rotatably journals an upright shaft 12 for free rotation about a vertical axis. The shaft 12 is operatively connected to generating unit 11. A secondary framework 14 having an outer periphery 15 is centered on shaft 12 and is fixed for rotation therewith. A number of vertical posts 17 are mounted about periphery 15, parallel with and equally angularly and radially spaced with respect to the shaft 12, each to receive a flexible vane 20. Vanes 20 each include opposed areal surfaces 21 fixed along a post and extending to opposite sides thereof to divide surfaces 21 into inner and outer surface sections 21a and 21b respectively. Inner srfaces 21a and include an inward side edge 22 on one side of the post 17. Outer surfaces 21b include outward side edges 23 on the opposite sdes of the post 17. A connecting means 25 is provided between the inner and outward vane edges 22 and 23, and the secondary framework 14 to tether the vane sections 21a and 21b.

The vanes 20 function in response to winds of varying velocity to rotate the frame 14 and shaft 12 about the vertical shaft axis and thereby produce electrical energy through generating unit 11. Generating unit 11 may be of any conventional form and will not be described in detail, the thrust of the present application being toward the wind energy conversion device as described herein.

An operational circuit is defined as the circular paths of vanes 20 moving about the shaft axis in response to directional wind force. This circuit may be divided into two semi-circles or sides: a leeward side wherein the rotational direction of the vanes is substantially in the same direction as the wind force; and a windward side wherein the rotational direction of the moving vanes is opposed to the direction of wind force.

The connecting means 25 is utilized to hold the areal surfaces 21 of vanes 20 open against the wind force on the leeward side and allow the vanes to fold on themselves to optimize the angular distance about the circuit where wind energy is successfully translated to influence rotation of shaft 12 in a desired direction.

The secondary framework 14 is comprised of an upper wheel member 27 and a lower wheel member 28, vertically aligned on shaft 12 (FIG. 3). Wheel 27 includes a plurality of radially oriented spokes 30 that are equally spaced about the axis of shaft 12. Similarly, the lower wheel 28 includes a plurality of spokes 31 that are equal in number to and vertically aligned with spokes 30. Wheels 27 and 28 include peripheral rims 34 and 35 respectively. The posts 17 extend vertically between rims 34 and 35. Wheels 27 and 28 are mounted by central hubs 32 and 33 to the shaft 12.

Vanes 20 are rectangular, with edges 22 and 23 as sides. Edges 22 and 23 are joined at their upper and lower ends by top vane edges 37 and bottom vane edges 38 respectively. The vanes are constructed of conventional flexible material such as that suitable for sails.

Connecting means 25 is comprised of a plurality of flexible connecting members or cords divided into sets of inner cords 39 and outer cords 39a extending from corners of the vanes to secondary frame 14. The inner cord sets 39 are connected to vane corners along the inner vane edges 22. Cord sets 39 extend from inner edges 22 to corresponding eyelets 43 locating a first set of connecting points 43a along the spokes 30 and 31 at a fixed radius from shaft 12. The outer cord sets 39a are connected to vane corners along the outer vane edges 23 and extend therefrom to corresponding eyelets 43, locating a second set of connecting points 43b along spokes 30 and 31. The second set of connecting points 43b is spaced from the shaft axis by a radius greater than a corresponding radius to the connecting points 43a of the first set.

The eyelets 43 are designed as a safety release means and expand under a prescribed amount of stress to allow the associated cords to slip from engagement therewith. Once disconnected, the vanes may flex freely in the wind. This safety feature reduces possibility of damage to vanes 20 and other structure in very high velocity winds.

Two important preferred features relating to the mounting arrangement of the vanes 20 on the secondary frame 14 and specific proportions and positioning of the connecting members between the framework 14 and vanes 20 will now be discussed in greater detail. Each feature is independent of the other; i.e., will function serviceably without the other, but the combination of both features, as will become evident, results in an extremely efficient transfer of wind energy to torque on the shaft 12.

The first feature is the specific arrangement of the individual vanes 20 on their respective posts 17. It is important to note that each vane 20 is fastened along its length to a post 17 at a position thereon intermediate the inner and outward edges 22 ad 23. By thus mounting the vanes 20, I am able to reduce "drag" on the windward side of the cicuit and correspondingly increase driving force on the opposite leeward side of the circuit. This happens as the vanes fold over onto themselves when they come into the windward side during operation. In this condition, the areal surfaces are substantially aligned with the wind direction and therefore do not present significant resistance to movement in a windward direction.

Preferably, each vane 20 is connected to corresponding post 17 in such a manner that the inner edge 22 is located by a horizontal distance along the inner areal section 21a from post 17 greater than the corresponding horizontal distance along the outer areal section 21b between the post 17 and the outward edge 23. With such an arrangement, the vane section 21a has a greater areal surface than vane section 21b. In operation, this arragement facilitates the billowing or opening of the vanes against the wind force on the leeward side at an optimum angular position in the rotational circuit.

The second important consideration is the relative lengths of the inner and outer cords 39, 39a connected between inner and outer edges 22 and 23, and the first and second sets of connecting points 43a and 43b on spokes 30 and 31. In order to produce increased operational efficiency, the inner cords 39 must be longer than the difference of the radial distances from the post axes and first set of connecting points 43a to the shaft axis. These distances are shown in FIG. 1, with the letter X representing the radial distances from the shaft axis to the first set of cord connecting points 43a, the letter Y representing the radial distance from the shaft axis to the post 17 (preferably greater than distance X), and the letter Z representing the length of each inner connecting cord 39. The relationship described above may be defined simply as the inequality:

$$Y - X < Z.$$

A similar relationship exists between the length of outer cords 39a and the difference of the distance Y to the radial distance D from the shaft axis to the second set of connecting points 43b. The radial distance D is greater than distance Y and their difference is less than the lengths B of the outer set of cords 39a. This relationship as described may also be simply defined as an inequality:

$$D - Y < B.$$

The above described relationships are important to the increased efficient operation of my device both in relatively high velocity wind but more importantly during low velocity wind. The relationships described allow for automatic positioning of the inner and outer vane edges for optimum power transmission about a large portion of the operational circuit.

Reference will now be had in particular to FIGS. 1 and 2 to assist in describing the intended operation of my invention. FIG. 2 shows a diagram or legend in which the circle about which the vanes pass is divided into 8 equal sectors. According to the wind direction as indicated by the arrow A, the sectors 1–4 represent the leeward side and sectors 5–8 represent the windward side of the circuit. In such a directional wind, the vanes in sectors 2, 3 and 4 billow open, presenting the entire areal surface 21 of each vane therein to the wind. Obviously, the resultant forces transmitted to shaft 12 will have a positive influence on counterclockwise rotation (with respect to FIGS. 1 and 2) of my device.

Continuing along the counterclockwise path, the vanes moving into sectors 5 and 6 are shifted by the wind so the inner sections 21a of areal surfaces 21 overlap the outer sections 21b. Although the vanes in these sectors appear to be moving against the wind, a positive force in the counterclockwise direction is still produced. The inner vane edges 22 in sectors 5 and 6 are forced by the wind radially outward of the corresponding posts 17 by a distance defined by the lengths of inner cord sets 39 as described above. The wind produces a resultant force that is directionally oriented normal (perpendicular) to a chord between the posts and inner vane edges; and in sectors 5 and 6, these resultant forces are disposed slightly toward the counterclockwise direction of vane travel. Thus, even in sectors 5 and 6, where the inner vane edges 22 are radially outward of posts 17, a positive counterclockwise force is still produced. This is a very important factor when considering efficient operation of the device particularly in low velocity winds.

At an angular area between sectors 6 and 7 the vanes 20 come into direct confrontation with the wind. In this condition, as shown in FIG. 1, no counterclockwise force is produced. Rather, the areal surfaces 21a and 21b flex freely in the wind as shown. A slight negative force is evidenced at this point solely from the wind against the windward side of frame 14 and posts 17.

As the vanes continue about the circuit into sectors 7 and 8, the wind forces the outer vane sections 21b radially inward to partially overlap the inner sections 21a. The outer cords 39a are sufficiently long as described above to allow the outer vane edges 23 to move radially inward of the associated posts 17. The wind produces a resultant force that is directionally oriented normal to a chord between the outer edges 23 and associated posts 17. Again, these forces are disposed toward the counterclockwise direction of vane travel and therefore add to the total counterclockwise force produced on shaft 12 even though the vane is on the windward side.

Finally, in sector 1, as the vanes complete one circuit and begin another, the outer vane sections 21b are again shifted as the outer edges 23 and associated posts 17 move past an aligned condition with the wind.

FIGS. 4 and 5 illustrate in greater detail the forces produced on the vanes located in sectors 2 and 6 respectively. Note since the vanes are connected intermediate their edges 22 and 23 to posts 17, that a separate vector resultant is produced for each vane section. These vectors may be added graphically to result in the final resultant. In FIGS. 4 and 5 the wind direction is indicated by an indicator arrow 50. This direction is identical to the wind direction indicated in FIGS. 1 and 2.

In FIG. 4, a pair of independent vectors 51 and 52 are shown normal to cords 48 and 49 to graphically indicate the forces and their directional components resulting from the wind coming from the direction shown by arrow 50. Vectors 51 and 52 have been graphically added in FIG. 4 to produce a final resultant vector 53. The directional component of vector 53 is closely similar to the direction of vane travel (indicated by an arrow 55 in FIGS. 4 and 5).

The wind force works primarily against inner vane surfaces 21a in a substantially skewed orientation when they reach the 6th sector. Such a relationship is shown graphically in FIG. 5. The outer areal surface 21b is overlapped by surfaces 21a in this condition so the only significant force produced is shown by a single vector 57. Vector 57 is normal to the chord 58 connecting post 17 and inner vane edge 22 and, because less surface area is presented directly against the wind, the magnitude of the resultant force is somewhat smaller than that of the resultant vector 53 produced and shown in FIG. 4. However, this force has its directional component inclined toward the counterclockwise direction of travel and therefore produces a positive effect on counterclockwise rotation.

Similar vector diagrams may be produced to shown the substantial angular distance through which the vanes operate to produce a positive turning force against the shaft 12. In actual fact, the only angular distance where the vanes do not produce such force is a small and relatively insignificant area between sectors 6 and 7.

Since the apparatus operates efficiently to produce a torsion on the shaft 12 through almost the complete circuit, it follows that the device will operate efficiently in relatively low wind velocity. It has been my experience that a wind velocity of approximately 2 miles per hour will effectively rotate the device.

It may have become apparent from the above description and attached drawings that various changes and modifications may be made therein without departing from the intended scope of my invention. Therefore, only the following claims are to be taken as definitions of this invention.

What I claim is:

1. A wind energy conversion device, comprising:
 a central supporting framework;
 an upright shaft journalled in the framework for free rotation about a vertical axis;
 a secondary frame centered on the shaft and mounted thereto for rotation therewith, with an outer periphery spaced radially from the shaft axis;
 a plurality of axial posts mounted to the frame periphery parallel with the shaft;
 a flexible vane mounted to each post and including an areal surface with inward and outward side edges extending from opposite sides of the post forming two vane sections; and
 connecting means extending between the vane edges to the secondary frame for holding the areal surface of the vanes on a leeward side of the frame against the wind as the frame rotates about the shaft axis and for allowing the vanes to fold over the posts with the vane sections overlapping each other on a windward side of the frame as the frame rotates about the shaft axis.

2. The wind energy conversion device as recited in claim 1 wherein:
 the connecting means is comprised of connecting members extending from the side edges of each vane to corresponding connecting points on the framework.

3. The wind energy conversion device as recited in claim 1, further comprising:
 release means between the connecting means and secondary frame for releasing the connecting means from the secondary frame in response to high wind velocity.

4. The wind energy conversion device as recited in claim 1 wherein the connecting means is comprised of:
 inner connecting members extending between the inward side edges of the vanes and a first set of connecting points on the secondary frame spaced from the shaft axis by a first radius;
 outer connecting members extending between the outward side edges of the vanes and a second set of connecting points on the secondary frame spaced from the shaft axis by a second radius greater than the first radius.

5. The wind energy conversion device as recited in claim 4 wherein the lengths of the inner connecting members are greater than the difference in length of the first radius and a third radius from the posts to the shaft axis.

6. The wind energy conversion device as recited in claim 5 wherein the second radius is greater than the third radius.

7. The wind energy conversion device as recited in claim 4 wherein the lengths of the outer connecting members is greater than the difference in length of the second radius and a third radius from the posts to the shaft axis.

8. The wind energy conversion device as recited in claim 5 wherein the lengths of the second and third radii — and wherein and second radius is greater than the third radius.

9. The wind energy conversion device as recited in claim 1 wherein the horizontal distances along the flexible vanes from the posts to respective inward side edges is greater than the horizontal distances along the flexible vanes from the posts to the outward side edge.

10. The wind energy conversion device as recited in claim 1 wherein the vanes are constructed of a flexible fabric, and are rectangular in configuration with flexible top and bottom edges joining the inward and outward side edges.

* * * * *